United States Patent [19]
Habeeb et al.

[11] 3,770,557
[45] Nov. 6, 1973

[54] HIGH TEMPERATURE INSULATION
[75] Inventors: Kareem A. Habeeb, Livonia; Jerry E. White, Dearborn Heights, both of Mich.
[73] Assignee: Ford Motor Company, Dearborn, Mich.
[22] Filed: Oct. 23, 1970
[21] Appl. No.: 83,548

[52] U.S. Cl................. 161/54, 161/48, 161/53, 161/113, 161/196, 60/39.51 H, 165/136
[51] Int. Cl.................. B32b 7/08, B32b 15/14
[58] Field of Search ............... 161/48, 53, 54, 196, 161/133, 111, 113, 114, 115, 89, 95; 165/136; 52/671

[56] References Cited
UNITED STATES PATENTS
2,148,281   2/1939   Scott................................. 52/671 X
2,282,293   5/1942   Christenson..................... 161/54 X
349,183     9/1886   Stewart............................. 161/53
1,160,316  11/1915   Paterson .......................... 161/115
2,763,586   9/1956   Noyes............................... 161/115
3,118,807   1/1964   Holcomb .......................... 161/196
3,275,073   9/1966   Pincus............................... 52/671 X
1,240,462   9/1917   Lohse ............................... 161/89 X Primary Examiner—George F. Lesmes
Assistant Examiner—Lorraine T. Kendell
Attorney—John R. Faulkner and Glenn S. Arendsen

[57]   ABSTRACT

An expanded metal mesh is corrugated so the ridges and valleys of the corrugations extend in the direction of expansion. An insulating material is applied to the mesh to form a composite insulating blanket in which the mesh is located adjacent one surface. The other surface of the composite blanket is placed against a substrate and fasteners mechanically attach the mesh to the substrate.

5 Claims, 4 Drawing Figures

PATENTED NOV 6 1973 3,770,557
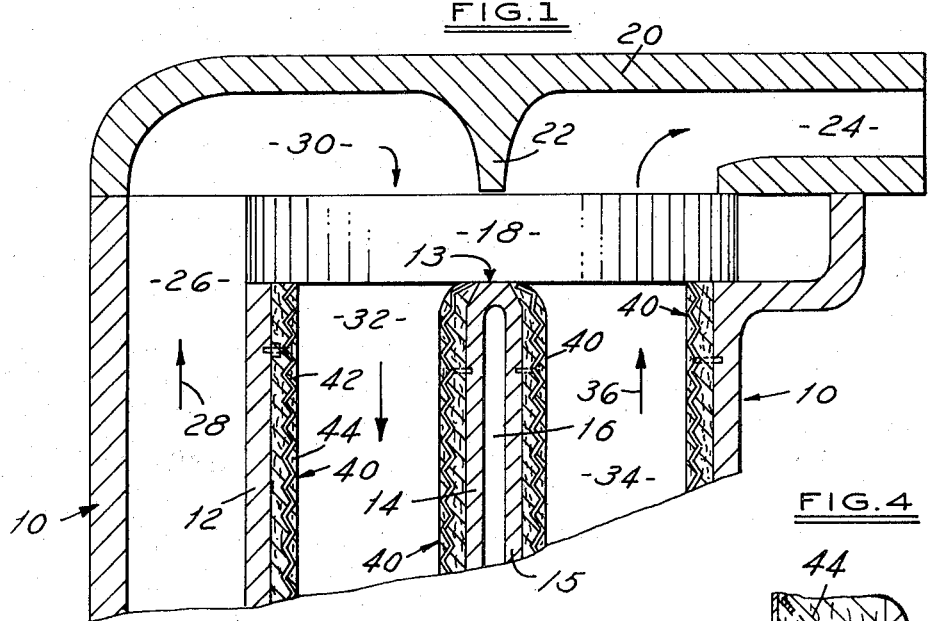
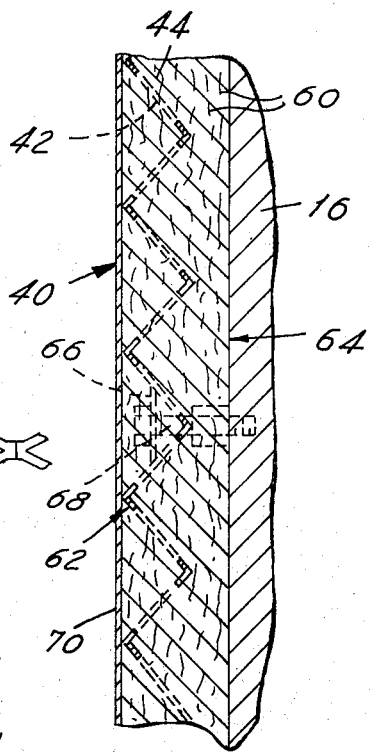
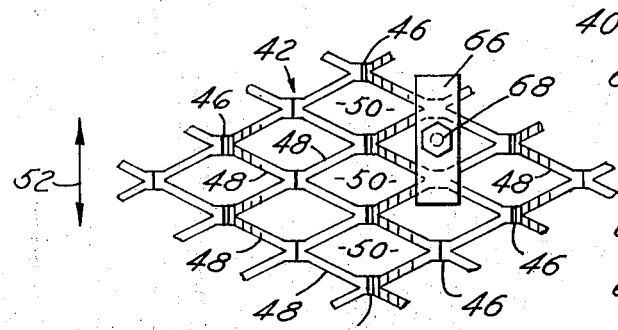
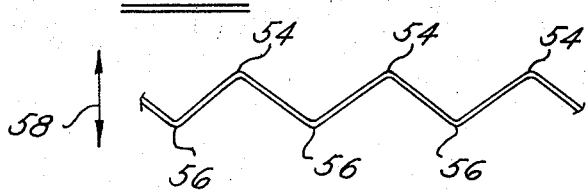
INVENTORS
Jerry E. White
Kareem A. Habeeb
BY John R. Faulkner
Glenn L. Arendsen
ATTORNEYS 3,770,557

HIGH TEMPERATURE INSULATION

SUMMARY OF THE INVENTION

While thermal insulation for many low temperature applications typically is bonded to the insulated structure, the thermal expansion forces generated by high temperature applications generally necessitates some type of mechanical attachment between the insulation and the insulated member. The conventional mechanical attachment involves covering a blanket of the insulating material with a metal mesh and clamping the mesh to the substrate with threaded fasteners.

Several undesirable characteristics result from the use of such structures in high velocity air streams such as those encountered in gas turbine engines. For example, the irregular nature of the exposed metal mesh and the heads of the fasteners produce undesirable turbulence. The exposed metal mesh also heats rapidly to the temperature of the gas stream and significant amounts of heat can be conducted through the metal fasteners to the insulated substrate. Embedding the metal mesh in the insulating material is an apparent solution to the latter problem, but the insulating material exterior of the mesh rapidly flakes off at the high temperatures. Such flakes can become clogged in the engine to cause more serious problems.

This invention provides an insulated structure that reduces heat transfer to the insulated substrate, provides a smooth surface to minimize turbulence and resists flaking and spalling at temperatures up to and exceeding 2,000°F. The structure is made up of an insulating blanket comprising a corrugated mesh material embedded in an insulating material. The ridges of the corrugations preferably are at the outer surface of the blanket and the blanket has sufficient insulating material on the inner surface of the mesh so that the mesh is spaced a short distance from the substrate when the insulating material contacts the substrate. Mechanical fasteners attach the mesh material to the substrate.

Corrugated expanded metal in which the corrugations run in the same direction as the expansion is highly useful as the mesh material. Flat expanded metal is formed from integral metal sheets by cutting a large number of small, staggered slits in the sheet and then stretching the sheet to enlarge the slits into openings that usually approximate a diamond shape. A typical flat expanded metal mesh is shown in U.S. Pat. Pincus No. 3,275,073. The expanded sheet then is corrugated by producing ridges and valleys therein that run in the direction of the expansion. Such ridges and valleys preferably correspond to the ends and centers of the staggered openings.

For high temperature applications, a refractory fiber blended with a binder preferably is used as the insulating material. Useful fibers typically have lengths up to 1 ½ inches and diameters of less than one and up to about 10 microns. Fiber composition typically is a mixture of alumina and silica with small amounts of boron oxide. Colloidal silica can be used as the binder.

The fiber and binder can be formed into a thick slurry that can be packed, troweled or otherwise deposited around the corrugated expanded mesh. A particularly convenient technique involves placing the corrugated mesh on a screen and drawing the slurry through the screen to deposit binder and fibers around the mesh. The binder then is cured to form an integral, composite blanket.

BRIEF DESCRIPTION OF THE DRAWINGS

FIG. 1 is a partial sectioned view of the regenerator portion of a gas turbine engine.

FIG. 2 is a top view of the corrugated expanded metal mesh used in the insulated structure and FIG. 3 is an end view of the mesh of FIG. 2.

FIG. 4 is an enlarged section of an insulating blanket applied to a substrate.

DETAILED DESCRIPTION

Referring to FIG. 1, the housing of a regenerative gas turbine engine comprises an oval shaped exterior wall 10. Spaced a short distance from the left side of outer wall 10 is an inner wall 12. A bulkhead wall 13 that bifurcates into two closely adjacent legs 14 and 15 defining an open space 16 therebetween is located between wall 12 and the right side of outer wall 10. Wall 13 is located on a diameter of a rotating regenerator 18 that has one end terminating on the right side of wall 10 and the other end terminating on wall 12. A cap 20 rests on top of the exterior wall and has a downward projection 22 located directly above bulkhead wall 13. An exhaust passage 24 is located in the right side of cap 20.

Wall 12 and the left side of outer wall 10 define a gas flow passage 26 through which compressed gases from the engine compressor (not shown) flow in the direction of arrow 28 to a space 30 defined by the portion of cap 20 to the left of projection 22. Compressed gases in space 30 flow through the left hand sector of regenerator 18 and into a passage 32 defined by wall 12 and bulkhead leg 14. Passage 32 conducts the gases to the engine combustor (not shown) which mixes fuel therewith and ignites the resulting mixture.

Hot gases from the combustor pass to the engine turbine wheels (not shown). Gases leaving the turbine wheels pass through a passage 34 defined by bulkhead leg 15 and the right side of housing wall 10 in the direction of arrow 36 and thence through the right sector of regenerator 18 and out exhaust passage 24. Small amounts of compressed gases from passage 26 bypass the regenerator and flow through space 15 to cool the bulkhead wall; these gases can reunite with the gases in passage 32 prior to combustion.

Regenerator 18 rotates in the conventional manner to transfer heat from the gases leaving passage 34 to the gases entering passage 32. In a typical engine, the gases in passage 26 have a temperature of about 400°F. and a pressure of about 4 atmospheres. The gases in passage 32 have a temperature of about 1200°F. and a pressure slightly below 4 atmospheres. Passage 14 contains gases having a temperature of about 1900°F. and a pressure slightly below 4 atmospheres while the gases in passage 34 have a temperature of about 1350°F. and a pressure slightly above atmospheric. Housing walls 10, 12 and 13 usually are made of cast nodular iron. Gas velocities in the passages range from about 10 feet per second at engine idling to about 40 feet per second at maximum power.

Bulkhead wall 13 thus operates at a temperature where the strength of its nodular iron is relatively low. The bulkhead wall also is subjected to a considerable force because of the pressure differential between gas streams 32 and 34; for example, a typical bulkhead wall has a total area of about 280 square inches so that the total force produced by the pressure differential exceeds 12,600 pounds.

An insulating blanket 40 of this invention is applied to both exterior sides of bulkhead wall 13, the passage 32 side of wall 12, and the passage 36 side of wall 10. Blanket 40 comprises a corrugated expanded metal mesh 42 embedded in an insulating material 44. The ridges of the corrugations are at the outer surface of the blanket and insulating material spaces the mesh a short distance from the appropriate wall.

Referring to FIGS. 2 and 3 also, the expanded metal mesh 42 comprises a plurality of metal pads 46 connected to each other by narrow metal strips 48. The pads and strips define a plurality of diamond shaped openings 50. Such mesh is made by producing a plurality of spaced, parallel slits in a metal sheet and stretching the sheet in a direction perpendicular to the slits. In FIG. 2, the slits would run from left to right and stretching would be conducted in the direction of arrow 52. Stretching expands the slits to form openings 50.

After stretching, the mesh is corrugated so the ridges 54 and valleys 56 of the corrugations extend in the direction of the stretching. Ridges 54 and valleys 56 preferably coincide with pads 46 as shown. The resulting corrugated expanded mesh has a considerable amount of flexibility both parallel to the stretching direction (by virtue of the stretching) and horizontally perpendicular thereto (by virtue of the corrugations) but nevertheless has a considerable amount of strength in its depth direction (i.e., the direction of arrow 58 in FIG. 3).

The resulting mesh then is embedded in a refractory fiber 60 (FIG. 4) blended with a binder that is cured to form a composite insulating blanket 44. Blanket 44 is formed conveniently by preparing a thick slurry of fibers and binder, placing the mesh in contact with a porous wire screen, and drawing the slurry through the mesh so fibers and binder deposit on the screen to build up a considerable blanket thickness around and extending for a definite length above the mesh. The mesh, fiber and binder composite is removed and cured into an integral composite blanket in which the ridges of the mesh are located at or very close to one side 62 and the mesh is spaced a definite length from the other side 64.

Side 64 of the composite blanket is placed against walls 10, 12 and 13. Small amounts of blanket material are peeled back from certain locations above valleys of the mesh and small metal washers 66 are placed against the valleys. Threaded fasteners 68 are extended through the washers to threadably engage the substrate walls, thereby mechanically fastening the composite blanket to the substrate. The openings above the plates and fasteners then are recovered with the blanket material to produce a smooth surface.

Excellent results have been obtained in a gas turbine engine with stainless steel metal mesh about 0.020 inch thick. The mesh is expanded to produce a vertical dimension of openings 50 of about one-half inch and a horizontal dimension of about one inch. Strips 48 are about 0.050 inch wide. Corrugations of about one-half inch then are formed in the mesh. Corrugated wire screen and similar articles can be used in place of the corrugated expanded metal mesh but generally are not as convenient and do not have the strength and flexibility properties.

A particularly useful insulating material can be made from refractory fibers consisting essentially of about 51 weight percent alumina, 47 weight percent silica and 0.5 weight percent boron oxide with the balance trace amounts of iron oxide, sodium oxide and other inorganics blended with a colloidal silica binder. The fibers have a length up to about 1 ½ inches and a diameter ranging up to 10 microns and can be obtained from the Refractories division of the Carborundum Company, Niagara Falls, N.Y. Colloidal silica binder can be obtained from the Dupont Company. The binder typically makes up about 10–40 weight percent of the insulating material. About one-fourth – one-half inch of insulating material exists between the wall and the closest portions of the mesh.

Asbestos, quartz or similar fibers capable of surviving at the anticipated termperatures also can be used. The fibers can be chopped and ground to a particulate nature if desired. Alternate high temperature binders include ethyl silicate, water soluble silicates, and colloidal silica. For lower temperature applications, organic binders such as epoxy, polyimide, and polyamide materials can be used. To improve surface smoothness, additional binder or other materials can be painted on the outer surfaces of the blanket to form a thin coating 70. Coating 70 preferably covers exposed ridges of the mesh but is sufficiently thin to resist flaking.

Good mechanical fastening in the turbine engine is provided by stainless steel rectangular washers about one-fourth inch wide and one inch long spaced at 6–8 inch intervals in the valleys of the corrugations and attached to the walls by one-eighth inch threaded fasteners. Round washers or washers of other shapes sufficient to make good contact with the mesh also can be used. Studs welded or otherwise attached to the substrate can engage with appropriate plates or clips to fasten the composite blanket to the substrate in place of the threaded fasteners. The spacing of the mechanical fasteners can be varied widely depending on conditions.

Thus this invention provides thermal insulation that does not flake or separate from its substrate. The insulation also has a smooth outer surface that does not interfere significantly with rapidly flowing gases. In addition to its usefulness in gas turbine engines, the insulation also can be used in ovens, heat exchangers, other power plants and a variety of mechanisms or devices.

We claim:

1. An insulated structure suitable for use at relatively high temperatures and in contact with a gas stream moving at high velocity comprising
   a substrate,
   an insulating blanket on said substrate, said insulating blanket comprising a corrugated expanded metal embedded in an insulating material, the insulating material comprising refractory fibers blended with a binder, said insulating material contacting said substrate and said corrugated expanded metal having ridges and valleys with said ridges being at the outer surface of the insulating blanket and said valleys being spaced a short distance from said substrate,
   mechanical fastening means attaching said expanded metal to said substrate, and
   a thin coating on the surface of the insulating blanket for smoothing the exposed surface of the blanket and covering said ridges of said corrugated expanded metal.

2. The structure of claim 1 in which the corrugated expanded metal is a corrugated expanded metal having the ridges and valleys of the corrugations extending in the direction of the expansion.

3. The structure of claim 2 in which the valleys of the expanded metal are spaced at least one-fourth inch from the substrate.

4. The structure of claim 3 in which the insulating material comprises refractory fibers blended with an inorganic binder.

5. The structure of claim 1 in which the insulating material comprises refractory fibers blended with an inorganic binder.

* * * * *